United States Patent
Choi et al.

(10) Patent No.: US 10,477,414 B2
(45) Date of Patent: Nov. 12, 2019

(54) METHOD AND DEVICE FOR DATA DECODING BY TERMINAL IN WIRELESS COMMUNICATION SYSTEM

(71) Applicant: Samsung Electronics Co., Ltd., Suwon-si, Gyeonggi-do (KR)

(72) Inventors: Seunghoon Choi, Seongnam-si (KR); Donghan Kim, Osan-si (KR); Jinyoung Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/770,367

(22) PCT Filed: Oct. 31, 2016

(86) PCT No.: PCT/KR2016/012404
§ 371 (c)(1),
(2) Date: Apr. 23, 2018

(87) PCT Pub. No.: WO2017/074162
PCT Pub. Date: May 4, 2017

(65) Prior Publication Data
US 2018/0317098 A1   Nov. 1, 2018

(30) Foreign Application Priority Data
Oct. 30, 2015   (KR) .................. 10-2015-0152482

(51) Int. Cl.
*H04L 25/02* (2006.01)
*H04W 16/26* (2009.01)
(Continued)

(52) U.S. Cl.
CPC ............ *H04W 16/26* (2013.01); *H04B 1/713* (2013.01); *H04L 25/0204* (2013.01); *H04B 2201/696* (2013.01); *H04W 92/02* (2013.01)

(58) Field of Classification Search
CPC ...... H04W 16/26; H04W 92/02; H04L 25/02; H04L 25/02504; H04B 1/713
See application file for complete search history.

(56) References Cited

U.S. PATENT DOCUMENTS

2007/0098116 A1* 5/2007 Kim ................ H04B 1/70735
                                                         375/343
2010/0226337 A1   9/2010 Yang et al.
(Continued)

FOREIGN PATENT DOCUMENTS

| EP | 2 975 890 A1 | 1/2016 |
|---|---|---|
| WO | 2014142576 A1 | 9/2014 |
| WO | 2015/030523 A1 | 3/2015 |

OTHER PUBLICATIONS

Lenovo, Frequency hopping for different channels for Rel-13 eMTC, 3GPP TSG RAN WG1 Meeting #82bis, Sep. 25, 2015, Section 1-3, Drawings 1-2(b), Malmo, Sweden, R1-155807.
(Continued)

*Primary Examiner* — Chi Ho A Lee
(74) *Attorney, Agent, or Firm* — Jefferson IP Law, LLP

(57) ABSTRACT

The present disclosure relates to a communication technique for converging IoT technology with 5G communication systems for supporting higher data transmission rates than 4G systems and to a system therefor. The present disclosure can be applied to intelligent services (e.g. smart home, smart building, smart city, smart car or connected car, health care, digital education, retail business, security- and safety-related services, etc.) on the basis of 5G communication technology and IoT-related technology. The method for data decoding by a terminal in a wireless communication system according to the present disclosure comprises the steps of: receiving subframes on the basis of a configuration; obtaining at least one channel phase value on the basis of available subframes, which are configured to transmit identical downlink data,
(Continued)

among the received subframes; correcting the other channel phase value(s) with any one of said at least one obtained channel phase value as a reference value; and decoding the downlink data by means of the reference value and the corrected channel phase value(s).

14 Claims, 13 Drawing Sheets

(51) Int. Cl.
  *H04B 1/713* (2011.01)
  *H04W 92/02* (2009.01)

(56) References Cited

U.S. PATENT DOCUMENTS

| | | | |
|---|---|---|---|
| 2013/0195070 A1* | 8/2013 | Bashar | H04W 4/70 370/330 |
| 2014/0105120 A1* | 4/2014 | Jose | H04W 72/042 370/329 |
| 2015/0092893 A1* | 4/2015 | Tabet | H04L 27/2649 375/340 |
| 2015/0244508 A1* | 8/2015 | Kim | H04L 5/0023 370/329 |
| 2016/0029331 A1 | 1/2016 | Seo et al. | |
| 2016/0066290 A1* | 3/2016 | Cohen | H04W 56/0015 370/336 |
| 2016/0183308 A1* | 6/2016 | Eriksson | H04L 1/1812 370/329 |
| 2016/0285535 A1 | 9/2016 | Kim et al. | |
| 2017/0134881 A1* | 5/2017 | Oh | H04W 4/70 |
| 2017/0318487 A1* | 11/2017 | Yamamoto | H04B 7/0837 |
| 2018/0084502 A1 | 3/2018 | Choi et al. | |
| 2018/0109358 A1* | 4/2018 | Xing | H04L 1/08 |
| 2018/0139080 A1* | 5/2018 | Kim | H04L 1/0643 |
| 2018/0254853 A1* | 9/2018 | Jung | H04L 1/0038 |

OTHER PUBLICATIONS

ZTE, Frequency hopping patterns for MTC enhancement, 3GPP TSG RAN WG1 Meeting #82bis, Sep. 26, 2015, Section 1-4, Drawings 5, Malmo, Sweden, R1-155235.

QUALCOMM Incorporated: "PBCH repetition for MTC", 3GPP Draft; R1-155709 PBCH Repetition for MTC, 3rd Generation Partnership Project (3GPP), Mobile Competence Centre; 650, Route Des Lucioles; F-06921 Sophia-Antipolis Cedex; France, vol. RAN WGI, No. Malmo, Sweden; XP051002538, Oct. 4, 2015.

Nokia Networks: "Frequency Hopping for UEs in Coverage Enhancement", 3GPP Draft; R1-155130, 3rd Generation Partnership Project (3GPP), Mobile Competence Centre ; 650, Route Des Lucioles ; F-06921 Sophia-Antipolis Cedex; France vol. RAN WGI, No. Malmo, Sweden, XP051002114, Oct. 4, 2015.

European Search Report dated Sep. 3, 2018, issued in European Application No. 16860345.4.

\* cited by examiner

METHOD AND DEVICE FOR DATA DECODING BY TERMINAL IN WIRELESS COMMUNICATION SYSTEM

TECHNICAL FIELD

The present invention relates to a wireless communication system and, in particular, to a channel estimation and data decoding method of a terminal.

BACKGROUND ART

The wireless communication system has evolved to broadband wireless communication systems (e.g., $3^{rd}$ generation partnership project (3GPP) high speed packet access (HSPA) and long term evolution (LTE or evolved universal terrestrial radio access (E-UTRA)) and 3GPP2 high rate packet data (HRPD), ultra-mobile broadband (UMB), and institute of electrical and electronics engineers (IEEE) 802.16e that are capable of providing high-speed, high-quality wireless packet data communication services beyond the early voice-oriented services.

The LTE system, as one of the representative broadband wireless communication systems, uses orthogonal frequency division multiplexing (OFDM) in the downlink and single carrier frequency division multiple access (SC-FDMA) in the uplink. Such a multiple access scheme is characterized by allocating the time-frequency resources for transmitting user-specific data and control information without overlap of each other, i.e., maintaining orthogonality, so as to distinguish among user-specific data and control information.

The LTE system adopts a Hybrid Automatic Repeat Request (HARQ) scheme for physical layer retransmission when decoding failure occurs in initial data transmission. The HARQ scheme is designed to operate in such a way that a receiver that fails in decoding data sends a transmitter a negative acknowledgement (NACK) indicative of decoding failure in order for the transmitter to retransmit the corresponding data on the physical layer. The receiver combines the retransmitted data with the decoding-failed data to improve data reception performance. It may also be possible for the receiver to send the transmitter an Acknowledgement (ACK) indicative of successful decoding, when the data are decoded successfully, in order for the transmitter to transmit new data.

An LTE system may be configured to support a low-cost low-complexity user equipment (UE) (hereinafter, interchangeably referred to as low-cost, MCE, or M2M UE) by limiting some UE functions. A low-cost UE is likely to be suitable for MTC and M2M services in the fields of remote meter reading, crime prevention, and distribution. The low-cost UE is expected to become a promising means for realizing cellular-based Internet of things (IoT).

In order to meet the low-cost/low-complexity requirements, the low-cost UE operating in a narrowband with a bandwidth narrower than that of the system transmission band may communicate with the eNB using some or all RBs. For example, the low-cost UE has a capability to transmit and receive signals on a narrow band channel of 1.4 MHz as the smallest system transmission bandwidth supported in LTE/LTE-A and thus always communicates with the eNB in the bandwidth of 1.4 MHz. Accordingly, the eNB may configure the low-cost UE for communication therewith in one of a plurality of narrowbands within the system transmission bandwidth.

The eNB may also configure the low-cost UE for narrowband communication therewith according to a predetermined frequency hopping pattern. A narrowband for use by the low-cost UE spans 6 resource blocks, and the system transmission bandwidth contains a plurality of resource blocks arranged without being overlapped with each other. Since the resource blocks for use by the low-cost UE should be aligned along with the resource blocks for use by the legacy UEs within the system transmission bandwidth, the resource blocks for use by the low-cost UEs and legacy UEs are identical with each other.

In order to meet the low-cost/low-complexity requirements, consideration may be given to reducing the RF device cost by decreasing the number of receive antennas of the UE to 1 or to reducing the data reception buffer cost by setting an upper limit of the transport block size (TBS) capable of being processed by the MTC UE. Unlike the normal LTE UE that has a wideband signal transmission/reception function at least in 20 MHz bandwidth regardless of the system transmission bandwidth, the low-cost MTC is configured to have a maximum bandwidth less than 20 MHz to contribute to the realization of low-cost/low-complexity. For example, it may be possible to define the operation of a low-cost UE operating in a maximum channel bandwidth of 1.4 MHz in the LTE system with the channel bandwidth of 20 MHz.

The low-cost UE may experience poor coverage at a certain location such as cell boundary and, for coverage enhancement of the low-cost UE, consideration is given to repetitive transmission and frequency hopping. The repetitive transmission and frequency hopping method may be used for coverage enhancement for a normal LTE UE. There is therefore a need of a channel estimation and data decoding method for the low-cost UE performing the repetitive transmission and frequency hopping in the coverage enhancement mode which is differentiated from the channel estimation and data decoding method for the legacy normal LTE UE without coverage degradation.

In order to meet the increasing demand for wireless data traffic since the commercialization of 4th generation (4G) communication systems, the development focus is on the 5th generation (5G) or pre-5G communication system. For this reason, the 5G or pre-5G communication system is called a beyond 4G network communication system or post long-term evolution (LTE) system. Consideration is being given to implementing the 5G communication system in millimeter wave (mmWave) frequency bands (e.g., 60 GHz bands) to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna. Also, in order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation. Furthermore, the ongoing research includes the use of hybrid frequency shift keying (FSK) and quadrature amplitude modulation (QAM){FQAM} and sliding window superposition coding (SWSC) as advanced coding modulation (ACM), filter bank multi-carrier (FBMC), non-orthogonal multiple access (NOMA), and sparse code multiple access (SCMA).

Meanwhile, the Internet is evolving from a human-centric communication network in which information is generated and consumed by humans to the Internet of things (IoT) in which distributed things or components exchange and process information. The combination of the cloud server-based Big data processing technology and the IoT begets Internet of everything (IoE) technology. In order to secure the sensing technology, wired/wireless communication and network infrastructure, service interface technology, and security technology required for implementing the IoT, recent research has focused on sensor network, machine-to-machine (M2M) communication, and machine-type communication (MTC) technologies. In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy information technology (IT) and convergence of various industries.

Thus, there are various attempts to apply the IoT to the 5G communication system. For example, the sensor network, M2M communication, and MTC technologies are implemented by means of the 5G communication technologies such as beamforming, MIMO, and array antenna. The application of the aforementioned cloud RAN as a big data processing technology is an example of convergence between the 5G and IoT technologies.

DISCLOSURE OF INVENTION

Technical Problem

The present invention proposes a channel estimation and data decoding method and device of a low-cost UE supporting repetitive transmission and frequency hopping for coverage enhancement.

Solution to Problem

In accordance with an aspect of the present invention, a method of a terminal in a wireless communication system includes receiving subframes based on a configuration; acquiring at least one channel phase value based on available subframes configured to carry the same downlink data among the received subframes; compensating for, using one of the at least one channel phase value as a reference value, the remaining channel phase values; and decoding the downlink data using the reference value and compensated channel phase values.

In accordance with another aspect of the present invention, a terminal in a wireless communication system includes a transceiver configured to transmit and receive signals and a controller configured to control to receive subframes based on a configuration; acquire at least one channel phase value based on available subframes configured to carry the same downlink data among the received subframes; compensate for, using one of the at least one channel phase value as a reference value, the remaining channel phase values; and decode the downlink data using the reference value and compensated channel phase values.

Advantageous Effects of Invention

The present invention is advantageous in terms of enhancing coverage and data decoding reliability through channel estimation over multiple subframes for data decoding at the low-cost UE supporting repetitive transmission and frequency hopping for coverage enhancement.

MODE FOR THE INVENTION

Figure 1:
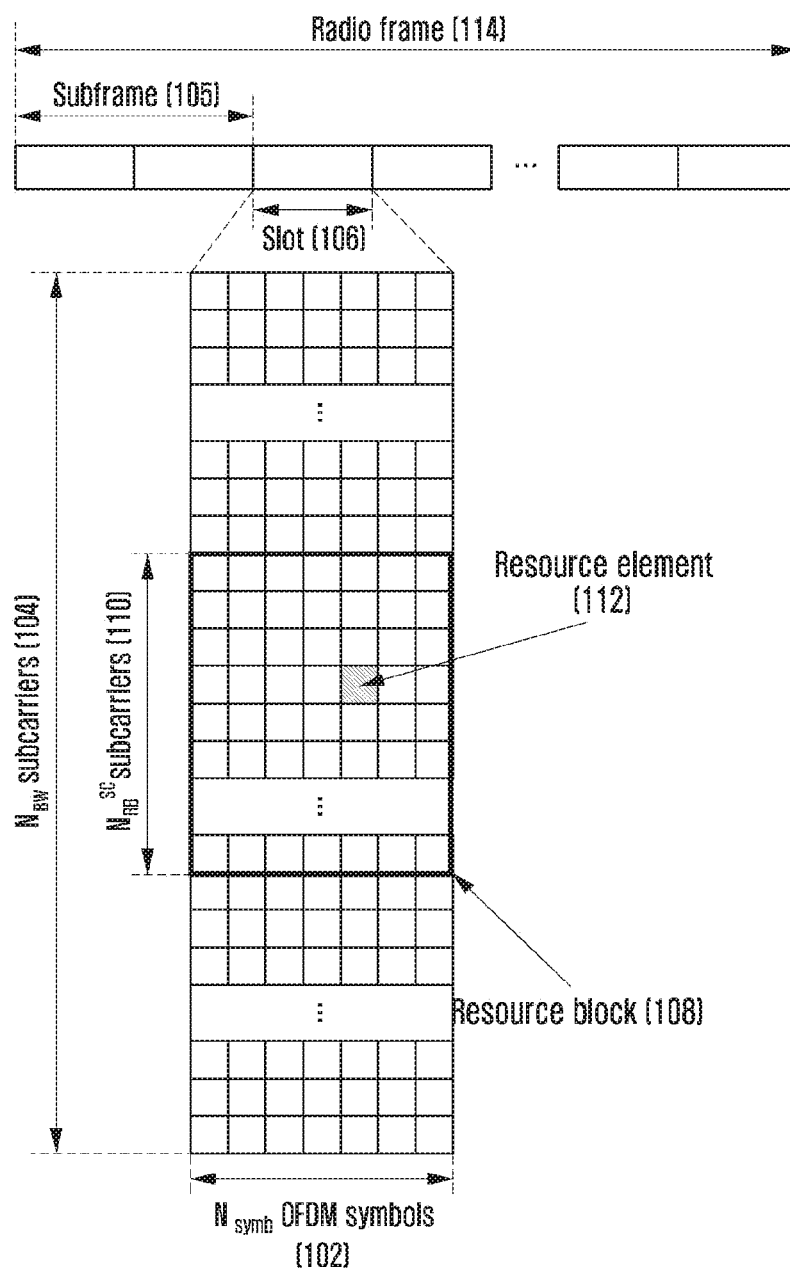
FIG. 1 is a diagram illustrating a basic structure of a time-frequency resource grid as a radio resource domain for transmitting downlink data and control channel in an LTE system.

Exemplary embodiments of the present invention are described in detail with reference to the accompanying drawings. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

Although the description is directed to exemplary LTE and LTE-A systems, the present invention can be applied to other communication systems supporting a base station scheduling, with a slight modification, without departing from the spirit and scope of the present invention.

Orthogonal frequency division multiplexing (OFDM) is a kind of multicarrier modulation scheme characterized by converting a serial symbol stream into parallel streams orthogonal to each other and transmitting the parallel streams over multiple subcarrier channels.

In the OFDM scheme, a modulation symbol is mapped to a 2-dimensional time-frequency resource grid. The time resource is divided into OFDM symbols that are orthogonal to each other. The frequency resource is divided into subcarriers that are orthogonal to each other. That is, in the OFDM scheme, an OFDM symbol designated on the time axis and a subcarrier designated on the frequency axis form a smallest resource unit called a resource element (RE). Since different REs maintain the orthogonality even when the signals undergo frequency selective channels, a receiver can receive the signals mapped to the different REs without mutual interference.

A physical channel is a channel of a physical layer for transmitting modulation symbols obtained by modulating one or more coded bit streams. An orthogonal frequency division multiple access (OFDMA) system configures a plurality physical channels according to the purpose of the information streams to be transmitted and the receiver. A transmitter and a receiver agree to use an RE for a certain physical channel, and such a rule is referred to as mapping.

In an OFDM communication system, the downlink bandwidth is composed of a plurality of resource blocks (RBs), and each physical resource block (PRB) is composed of 12 subcarriers arranged on the frequency axis and 14 or 12 OFDM symbols arranged on the time axis. Here, the PRB is a basic resource allocation unit.

A reference signal (RS) is a signal transmitted by an eNB for channel estimation of UEs, and there is a common reference signal (CRS) and a demodulation reference signal (DMRS) as a dedicated reference signal for use in the LTE communication system.

The CRS is transmitted across the whole downlink band for use by all UEs to receive for channel estimation, UE feedback information configuration, and control and data channel demodulation. The DMRS is transmitted across the whole downlink band for use by a specific UE to receive data channel demodulation and channel estimation; but, unlike the CRS, it is not used for feedback information configuration. The DMRS is transmitted in a PRB resource to be scheduled by the UE.

On the time axis, a subframe consists of two slots, i.e., first and second slots, each having a length of 0.5 msec. A physical downlink control channel (PDCCH) region as a control channel region and an enhanced PDCCH (ePDCCH) region as a data channel region are transmitted separately on the time axis. This aims to receive and demodulate the control channel signal as soon as possible. The PDCCH region is configured such that narrow channels constituting a control channel are arranged across the whole downlink band in a distributed manner.

There is a control channel (PUCCH) and a data channel (PUSCH) in uplink, and the acknowledgement channel and other feedback information are transmitted through the control channel for the case where there is no data channel and through the data channel for the case where there is the data channel. According to various embodiments of the present invention, the aforementioned channels may be designed for the purpose of narrowband communication with low-cost UEs so as to be differentiated from the channels designed for communication with the legacy LTE or LTE-A UEs and may be transmitted by an eNB to be totally distinguished.

According to an embodiment of the present invention, examples of the UE include the low-cost UE and LTE or LTE-A UE having a low-cost UE function.

FIG. 1 is a diagram illustrating a basic structure of a time-frequency resource grid as a radio resource domain for transmitting downlink data and a control channel in an LTE system.

In FIG. 1, the horizontal axis is the time domain, and the vertical axis is the frequency domain. The minimum unit on the time axis is an OFDM symbol, and Nsymb OFDM symbols 102 forms a slot 106, and 2 slots form a subframe 105. Each slot spans 0.5 ms, and each subframe spans 1.0 ms. A radio frame 114 is a time unit consisted of 10 subframes. In the frequency domain, the smallest transmission unit is a subcarrier, and the total system transmission bandwidth consists of NBW subcarriers 104.

In the time-frequency resource grid, the basic resource unit is a resource element (RE) 112 indicated by an OFDM symbol index and a subcarrier index. A resource block (RB) (or Physical Resource Block (PRB) 108 is defined by Nsymb consecutive OFDM symbols 102 in the time domain and $N_{SC}^{RB}$ consecutive subcarriers 110 in the frequency domain. That is, one RB 108 consists of NsymbxNRB REs 112. Typically, the RB is the smallest data transmission unit. In the LTE system, Nsymb=7, NRB=12, and NBW and NRB are proportional to the system transmission bandwidth. The data rate increases in proportion to the number of RBs scheduled for the UE. For the LTE system, 6 transmission bandwidths are defined. In the case of an FDD system in which downlink and uplink are separated in frequency, the downlink transmission bandwidth and uplink transmission bandwidth may differ from each other. The channel bandwidth denotes an RF bandwidth in comparison with the system transmission bandwidth. Table 1 shows the relationship between the system transmission bandwidth and channel bandwidth defined in the LTE standard. For example, an LTE system having 100 MHz channel bandwidth uses the transmission bandwidth of 50 RBs.

TABLE 1

| Channel bandwidth BW$_{Channel}$ [MHz] | 1.4 | 3 | 5 | 10 | 15 | 20 |
|---|---|---|---|---|---|---|
| Transmission bandwidth configuration N$_{RB}$ | 6 | 15 | 25 | 50 | 75 | 100 |

The downlink control information is transmitted in N OFDM symbols at the beginning of the subframe. Typically, N={1, 2, 3}. Accordingly, N value varies at every subframe depending on the control information amount to be transmitted. The control information includes a control channel transmission period indicator for indicating a number of OFDM symbols for conveying the control information, scheduling information for downlink or uplink data transmission, and HARQ ACK/NACK signal.

In the LTE system, the downlink or uplink data scheduling information is transmitted from the base station to the terminal using Downlink Control Information (DCI). The uplink (UL) denotes a radio link for transmitting data or control signals from the terminal to the base station, and the downlink (DL) denotes a radio link for transmitting data or control signals from the base station to the terminal. The DCI is categorized into different DCI formats depending on the purpose, e.g., indicating UL grant for UL data scheduling or DL grant for DL data scheduling, indicating usage for control information that is small in size, indicating whether multiple antenna-based spatial multiplexing is applied, and indicating usage for power control. For example, the DCI format 1 for DL grant is configured to include at least the following information.

Resource allocation type 0/1 flag: Resource allocation type 0/1 flag notifies whether the resource allocation scheme is type 0 or type 1. A Type-0 is to allocate resources in units of Resource Block Group (RBG) by applying a bitmap scheme. In the LTE system, the basic unit of scheduling may be a Resource Block (RB) that is expressed by time-frequency domain resources, and the RBG may include multiple RBs and may be the basic unit of scheduling in the Type-0 scheme. A Type-1 is to allocate a particular RB in an RBG.

Resource block assignment: Resource block assignment notifies an RB allocated for data transmission. The resources may be determined depending on the system bandwidth and the resource allocation scheme.

Modulation and coding scheme (MCS): MCS notifies a modulation scheme used for data transmission and a size of a transport block to be transmitted.

HARQ process number: HARQ process number notifies a process number of HARQ.

New data indicator: New data indicator notifies whether the HARQ transmission is an initial transmission or a retransmission.

Redundancy version: Redundancy version notifies a redundancy version of HARQ.

TPC command for PUCCH: Transmit Power Control (TPC) command for Physical Uplink Control Channel (PUCCH) notifies a power control command for a PUCCH that is an uplink control channel.

The DCI may be transmitted over a Physical Downlink Control Channel (PDCCH) or Enhanced PDCCH (EPDCCH) after undergoing a channel coding and modulation process.

Typically, the DCI may undergo channel coding for each terminal independently, and then the channel-coded DCI may be configured with its dependent PDCCH and transmitted. In the time domain, a PDCCH may be mapped and transmitted during the control channel transmission period. The frequency-domain mapping location of the PDCCH may be determined by an ID of each terminal, and it may be spread throughout the entire system transmission band.

Downlink data may be transmitted over a Physical Downlink Shared Channel (PDSCH) that is a physical channel for downlink data transmission. A PDSCH may be transmitted after the control channel transmission period, and the scheduling information such as the detailed mapping location in the frequency domain and the modulation scheme may be notified by the DCI that is transmitted over the PDCCH.

Using a 5-bit MCS in the control information constituting the DCI, the base station notifies the terminal of the modulation scheme applied to the PDSCH to be transmitted and the size of data (e.g., Transport Block Size (TBS)) to be transmitted. The TBS corresponds to the size given before channel coding for error correction is applied to the data (e.g., Transport Block (TB)) to be transmitted by the base station.

The modulation schemes supported by the LTE system may include Quadrature Phase Shift Keying (QPSK), 16 Quadrature Amplitude Modulation (QAM), and 64QAM, and they have modulation orders (Qm) 2, 4, and 6, respectively. That is, the QPSK modulation transmits 2 bits per symbol, the 16QAM transmits 4 bits per symbol, and the 64QAM transmits 6 bits per symbol.

In a TDD communication system, the downlink and uplink share the same frequency such that downlink and uplink transmissions alternate in the time domain. In LTE TDD, the downlink and uplink signals are discriminated by subframe. The numbers of downlink and uplink subframes may be determined to be equal to each other or different from each other such that the number of downlink subframes is greater than that of the uplink subframe or vice versa, depending on downlink and uplink traffic loads. In LTE, a radio frame consists of 10 subframes, and each subframe spans 1 ms.

TABLE 2

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Table 2 shows TDD UL-DL configurations specified in LTE. In Table 2, D denotes a downlink subframe, U denotes an uplink subframe, and S denotes a special subframe with the three fields: Downlink Pilot Time Slot (DwPTS), Guard Period (GP), and Uplink Pilot Time Slot (UpPTS). The DwPTS can be used for downlink control information transmission like an ordinary downlink subframe; or, if its length is long enough according to the configuration of the special subframe, for downlink data transmission. The GP is the interval required for downlink-to-uplink switch, and its length is determined according to the network configuration. The UpPTS can be used for transmitting a UE's Sounding Reference Signal (SRS) for uplink channel state estimation and a UE's Random Access Channel (RACH).

For example, in case of TDD UL-DL configuration #6, it may be possible to transmit downlink data and control information and control information at subframes #0, #5, and #9 and uplink data and control information at subframes #2, #3, #4, #7, and #8. The subframes #1 and #6 designated as special subframes can be used for control information transmission or, depending on the case, data transmission in downlink and SRS or RACH transmission.

Figure 2:
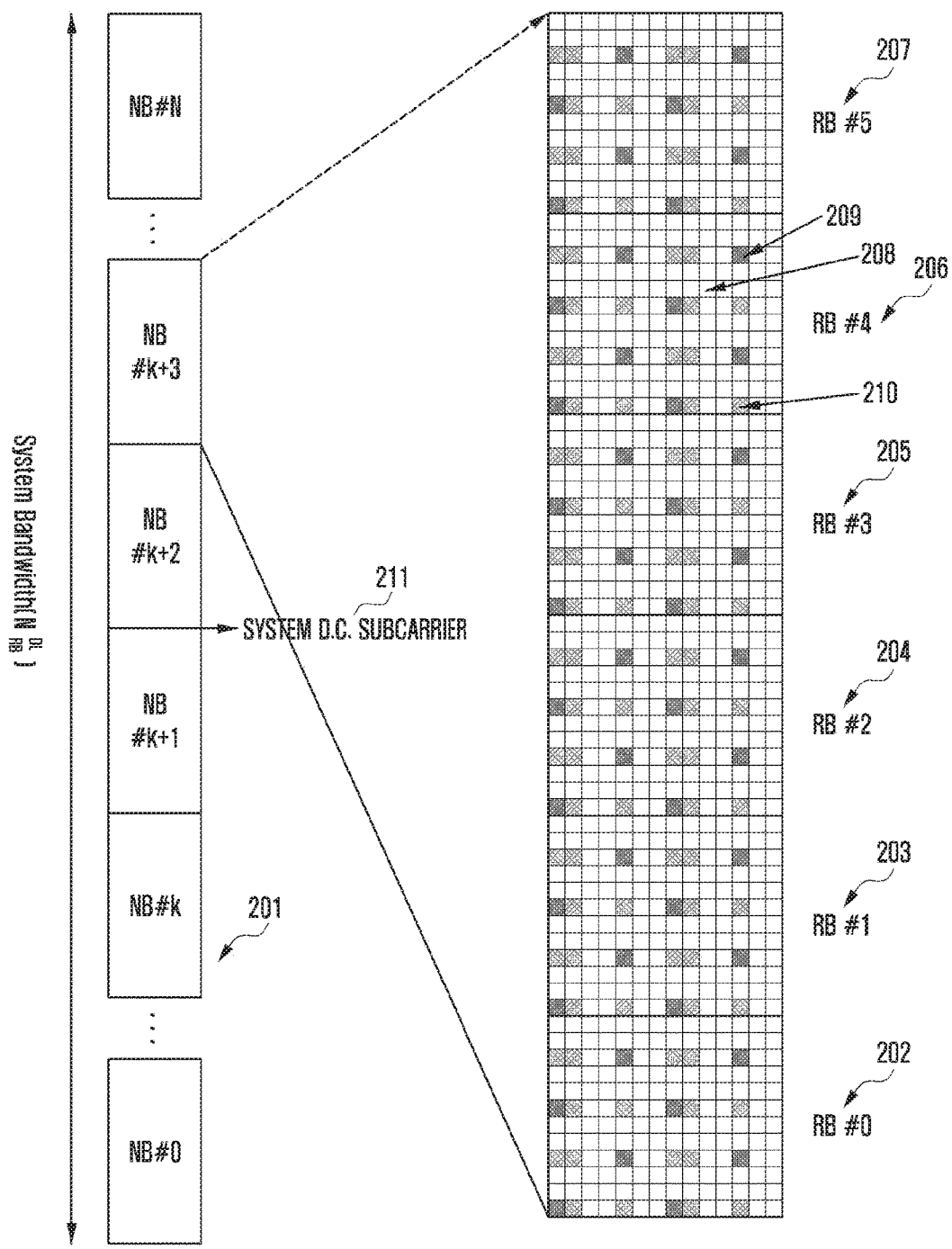
FIG. 2 is a diagram illustrating a narrowband structure for communication of a low-cost UE within a downlink system transmission bandwidth of an LTE system.

FIG. 2 is a diagram illustrating a narrowband structure for communication of a low-cost UE within a downlink system transmission bandwidth of an LTE system. As shown in FIG. 2, the system transmission bandwidth contains a plurality of narrowbands 201 for use by low-cost UEs. In this embodiment, it is assumed that the narrowband has a bandwidth of 1.4 MHz. As described above, each narrowband 201 spans 6 resource blocks 202 to 207 that are not overlapped with each other. Although FIG. 2 depicts an exemplary case where no narrowband 201 is overlapped with the system D.C. carrier 211, it may be possible for the system D.C. subcarrier 211 to be located within a narrowband 201. Even in such a case, the system D.C. subcarrier 211 is not included in the corresponding narrowband resource block. The narrowbands 201 may be sequentially delimited from one or both of the two ends of the system transmission bandwidth. It may also be possible to sequentially delimit the narrowbands 201 from the center of the system transmission bandwidth to both ends of the system transmission bandwidth. Regardless of the method for delimiting the narrowbands 201 in the system transmission bandwidth, it is possible to achieve the objects of the present invention. A low-cost UE can receive downlink signals transmitted by an eNB in all or some of the RBs of a specific narrowband 201 according to a configuration of the eNB or a predetermined rule.

As shown in FIG. 2, each of the resource blocks 202 to 207 forming one narrowband 201 includes null subcarriers 210 for cell-specific reference signal (CRS) 209 for use in channel estimation and equalization and CRS 209 being transmitted through other antenna ports as well as resource elements (REs) 208 for data and control information transmission. Also, a demodulation reference signal (DMRS) may be mapped in the resource blocks 202 to 207 according to the UE-specific transmission mode configured by the eNB.30

Figure 3:
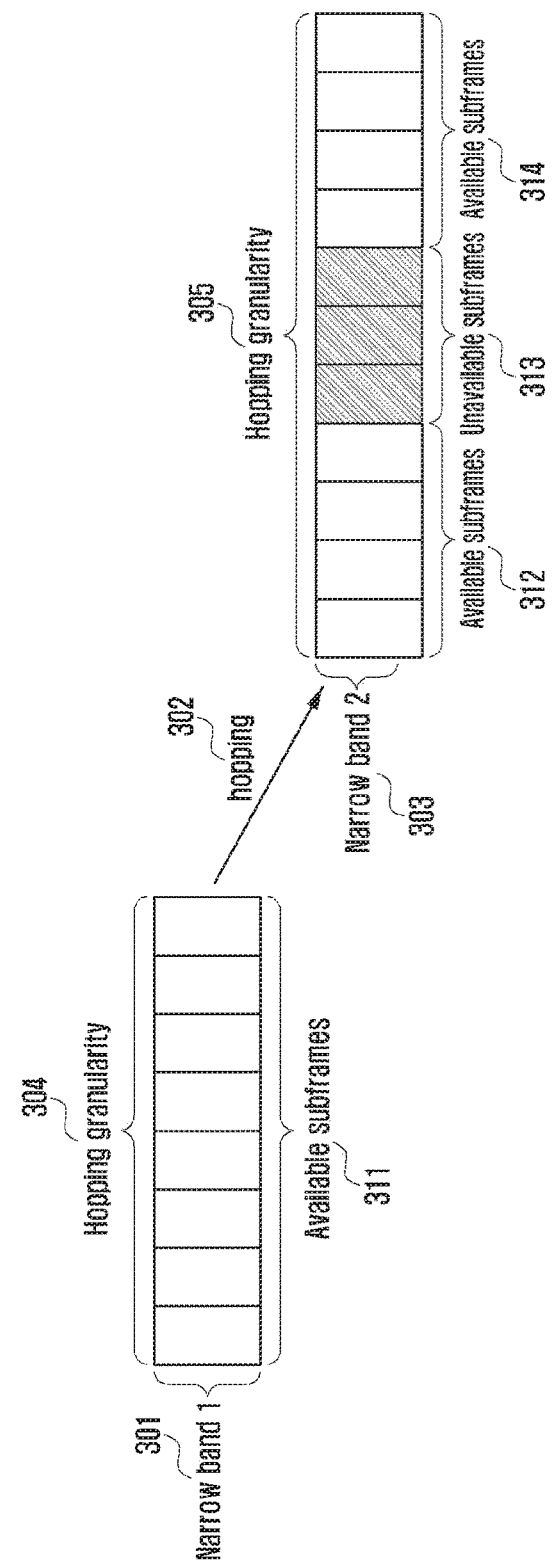
FIG. 3 is a diagram illustrating repetitive transmission and frequency hopping for downlink data transmission to a low-cost UE.

FIG. 3 is a diagram illustrating repetitive transmission and frequency hopping for downlink data transmission to a low-cost UE. The repetitive transmission is a technique of transmitting the same data repetitively in a predetermined number of subframes and the frequency hopping is a technique of switching between narrowbands in transmitting downlink data to a low-cost UE. The repetitive transmission-related information (e.g., number of subframes for repetitive transmission and available/unavailable subframe) or frequency hopping-related information (e.g., number of narrowbands for frequency hopping and hopping granularity) may be transmitted from the eNB to the UE through higher layer signaling or L1 signaling. The hopping granularity 304 means a number of subframes over which the data transmission stays at the same narrowband before hopping to another narrowband, and the repetitive transmission of the same data may be performed after hopping from one narrowband to another.

The eNB schedules downlink data transmission to the UE in order for the UE to receive the downlink data 301 during the available subframes 311. The downlink data are transmitted repetitively only at the available subframes among a plurality of consecutive subframes. The eNB may determine the available subframes and transmit the information on the available subframes to the UE through higher layer signal or L1 signaling. It may also be possible for the eNB to determine the unavailable subframes, instead of the available subframes, and transmit the information on the unavailable subframes to the UE through high layer signaling or L1 scheduling. The UE may analogize the available subframes carrying the data out of the information on the unavailable subframe. The unavailable subframes for downlink data transmission may include uplink subframes, MBSFN subframes, and subframes configured for measurement gap.

The downlink data transmission is hopped from one narrowband to another as denoted by reference number 302. Then, the UE receives the downlink data in the hopped narrowband 303. The hopped narrowband 303 includes available subframes 312 and 314 and unavailable subframes 313. The UE attempts to receive repetitive transmission at as many of the subframes of the hopping granularity 305 indicative of the number of repetitive transmissions that is set by the eNB and, although there are unavailable subframes, the number of unavailable subframes does not affect the hopping granularity 305. That is, the UE attempts to receive the repetitive transmissions at as many added available subframes as the number of unavailable subframes.

Figure 4:
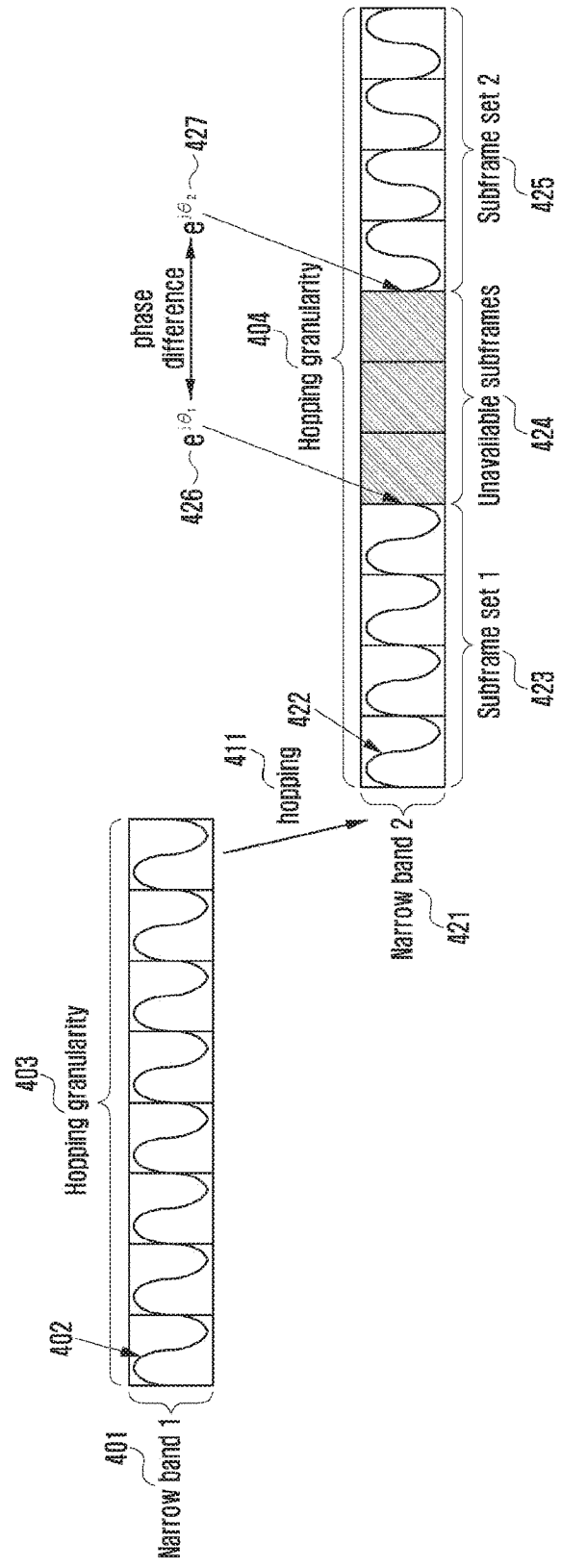
FIG. 4 is a diagram for explaining a problematic situation to be solved by the present invention.

FIG. 4 is a diagram for explaining a problematic situation to be solved by the present invention. A description is made of the problematic situation to be solved by the present invention with reference to FIG. 4.

In reference to FIG. 4, a low-cost UE receives repetitively-transmitted downlink data in a first narrowband 401. The repetitive transmission is a technique of transmitting the same data repetitively in a predetermined number of subframes, and the frequency hopping is a technique of switching between narrowbands in transmitting downlink data to a low-cost UE. The repetitive transmission-related information (e.g., number of subframes for repetitive transmission and available/unavailable subframes) or frequency hopping-related information (e.g., number of narrowbands for frequency hopping and hopping granularity) may be transmitted from the eNB to the UE through higher layer signaling or L1 signaling. The hopping period 403 means a number of subframes over which the data transmission stays at the same narrowband before hopping to another narrowband, and the repetitive transmission of the same data may be performed after hopping from one narrowband to another.

The eNB schedules downlink data transmission to the UE in order for the UE to receive the downlink data during the available subframes 311 in a certain narrowband (e.g., first narrowband 401). The downlink data are transmitted repetitively only at the available subframes among a plurality of consecutive subframes. The eNB may determine the available subframes and transmit the information on the available subframes to the UE through higher layer signal or L1 signaling. It may also be possible for the eNB to determine the unavailable subframes, instead of the available subframes, and transmit the information on the unavailable subframes to the UE through high layer signaling or L1 scheduling. The UE may analogize the available subframes carrying the data out of the information on the unavailable subframes. The unavailable subframes for downlink data transmission may include uplink subframes, MBSFN subframes, and subframes configured for measurement gap. The downlink data that are repetitively transmitted by the eNB during the available subframes pass a channel and, when a low-cost UE receives the downlink data, the waveform of the signal experienced by the downlink data may have a continuous phase across the subframes as denoted by reference number 402.

The downlink data transmission is hopped from one narrowband to another as denoted by reference number 411. Then, the UE receives the downlink data in the hopped narrowband (e.g., second narrowband 421). The hopped second narrowband 421 includes available subframes 423 and 425 and unavailable subframes 424. The UE attempts to receive repetitive transmission at as many of the subframes of the hopping granularity 404 indicative of the number of repetitive transmissions set by the eNB and, although there are unavailable subframes, the number of unavailable subframes does not affect the hopping granularity 404. That is, the UE attempts to receive the repetitive transmissions at as many added available subframes as the number of unavailable subframes. In this case, the waveform of the signal conveying the downlink data has a continuous phase across the available subframes 423 and 425, but the continuity is broken by the unavailable subframes 424 interposed between the available subframes 423 and 425, resulting in phase difference between the phase 426 of the available subframe set 1 423 and the phase 427 of the available subframe set 2 425. Such phase difference makes it difficult to estimate a channel with the integration of the available subframes 423 and 425. That is, when the UE performs channel estimation using all available subframes within a hopping period, the phase difference causes channel estimation performance degradation.

Figure 5:
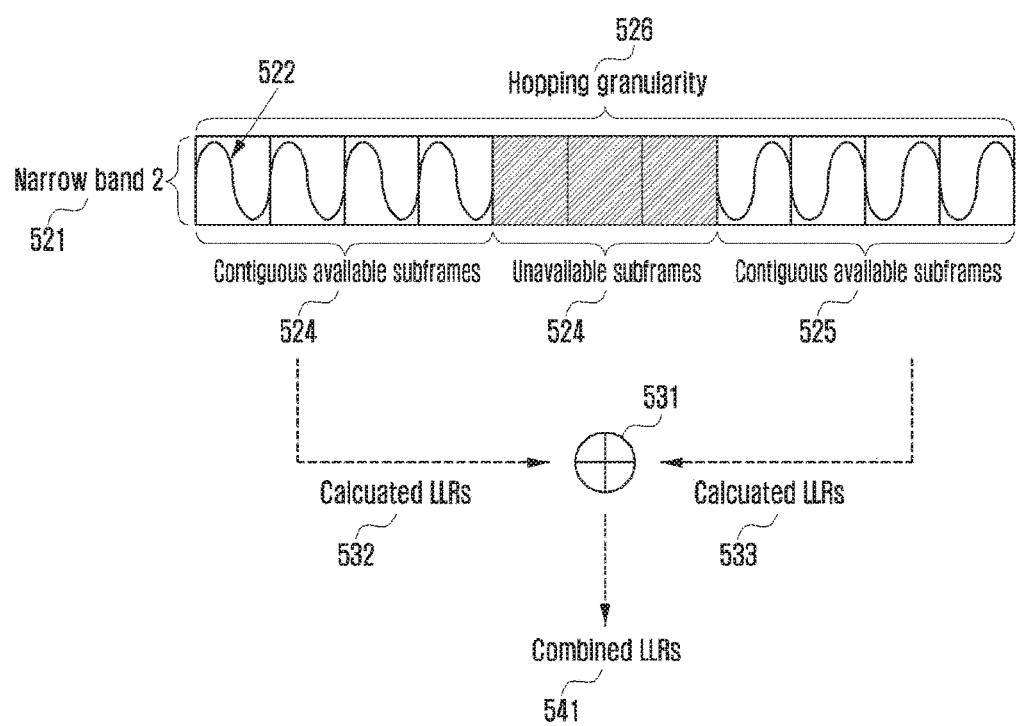
FIG. 5 is a diagram illustrating a channel estimation and downlink data decoding method according to the first embodiment of the present invention.

FIG. 5 is a diagram illustrating a channel estimation and downlink data decoding method according to the first embodiment of the present invention.

The first embodiment of the present invention proposes a method for estimating a channel without compensation for a phase difference caused by unavailable subframes and decoding downlink data.

In FIG. 5, the low-cost UE receives downlink data repetitively transmitted through a second narrowband 521. The repetitive transmission is a technique of transmitting the same data repetitively in a predetermined number of subframes, and the frequency hopping is a technique of switching between narrowbands in transmitting downlink data to a low-cost UE. The repetitive transmission-related information (e.g., number of subframes for repetitive transmission and available/unavailable subframes) or frequency hopping-related information (e.g., number of narrowbands for frequency hopping and hopping granularity) may be transmitted from the eNB to the UE through higher layer signaling or L1 signaling. The hopping granularity 526 means a number of subframes over which the data transmission stays at the same narrowband before hopping to another narrowband, and the repetitive transmission of the same data may be performed after hopping from one narrowband to another. The eNB schedules downlink data transmission to the UE in order for the UE to receive the downlink data during the available subframes through a certain narrowband 521. The downlink data are transmitted repetitively only at the available subframes among a plurality of consecutive subframes. The eNB may determine the available subframes and transmit the information on the available subframes to the UE through higher layer signal or L1 signaling. It may also be possible for the eNB to determine the unavailable subframes, instead of the available subframes, and transmit the information on the unavailable subframes to the UE through high layer signaling or L1 scheduling. The UE may analogize the available subframes carrying the data out of the information on the unavailable subframes. The unavailable subframes for downlink data transmission may include uplink subframes, MBSFN subframes, and subframes configured for measurement gap.

The subframes of the second narrowband 521 include available subframes 523 and 525 and unavailable subframes 524. The UE attempts to receive the repetitive transmission during the subframes corresponding to the hopping granularity 526 indicative of the number of repetitive transmissions that is set by the eNB and, although there are unavailable subframes, the number of unavailable subframes does not affect the hopping granularity 526. That is, the UE attempts to receive the repetitive transmissions at as many of the added available subframes as the number of unavailable subframes. In this case, when the downlink data is received, the channel has a continuous phase across the available subframes 523 and 525 as denoted by reference number 522, but the continuity is broken by the unavailable subframes 524 interposed between the available subframes 523 and 525, resulting in phase difference.

At this time, the UE performs cross-channel estimation by combining the subframes of the consecutive available subframes 523 and 525 and computes LLR for downlink data decoding based on the estimated channel. That is, the UE estimates the channel based on the combination of the subframes belonging to the consecutive available subframes 523 and generates an LLR for decoding downlink data based on the estimated channel as denoted by reference number 532. The UE also estimates the channel based on the combination of the subframes belonging to the consecutive available subframes 525 and generates an LLR for decoding downlink data based on the estimated channel as denoted by reference number 533. Then, the UE combines the LLR values in bitwise order as denoted by reference number 531 and decodes the downlink data using the combined LLRs as denoted by reference number 541. Although this embodiment is directed to the case where there are 2 sets of consecutive available subframes, the present invention is not limited thereto and includes embodiments directed to the cases where the number of sets of consecutive available subframes is more than 2.

Figure 6:
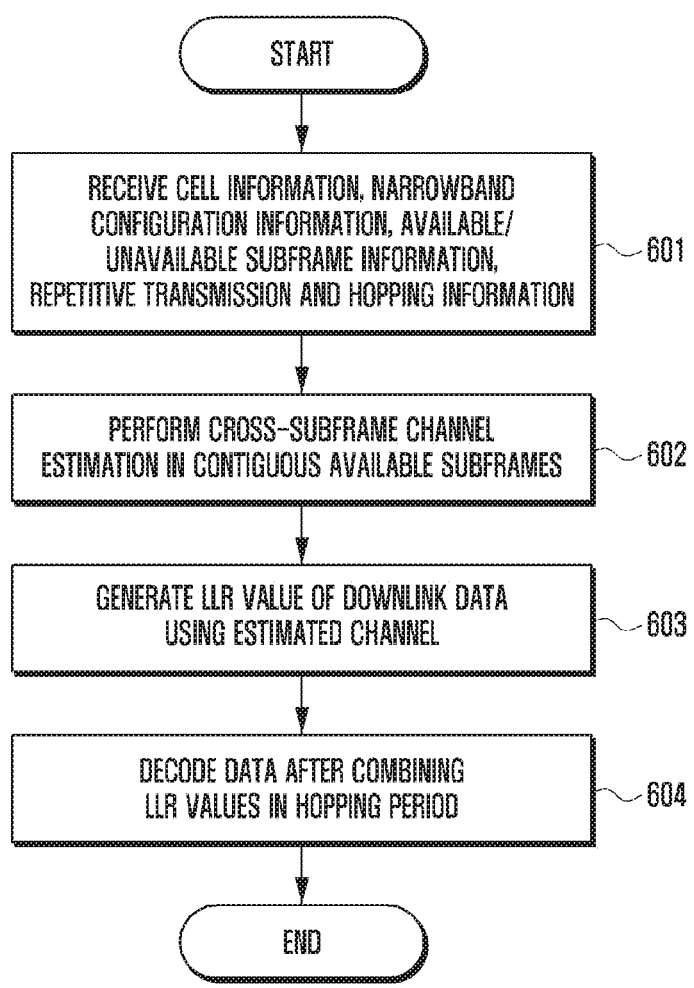
FIG. 6 is a flowchart illustrating a UE operation according to the first embodiment of the present invention.

FIG. 6 is a flowchart illustrating a UE operation according to the first embodiment of the present invention.

At step 601, the UE receives cell information, narrowband configuration information, repetitive transmission and frequency hopping information, and available/unavailable subframe information from an eNB through higher layer signaling or L1 signaling.

At step 602, the UE estimates a channel by performing a cross-subframe channel estimation on the subframes included in subframe sets (or group) composed of consecutive available subframes during a hopping period.

At step 603, the UE generates LLRs for downlink data using the estimated channel.

At step 604, the UE combines the LLRs generated for the sets of the consecutive available subframes during the hopping period and decodes the downlink data using the combined LLRs.

Figure 7:
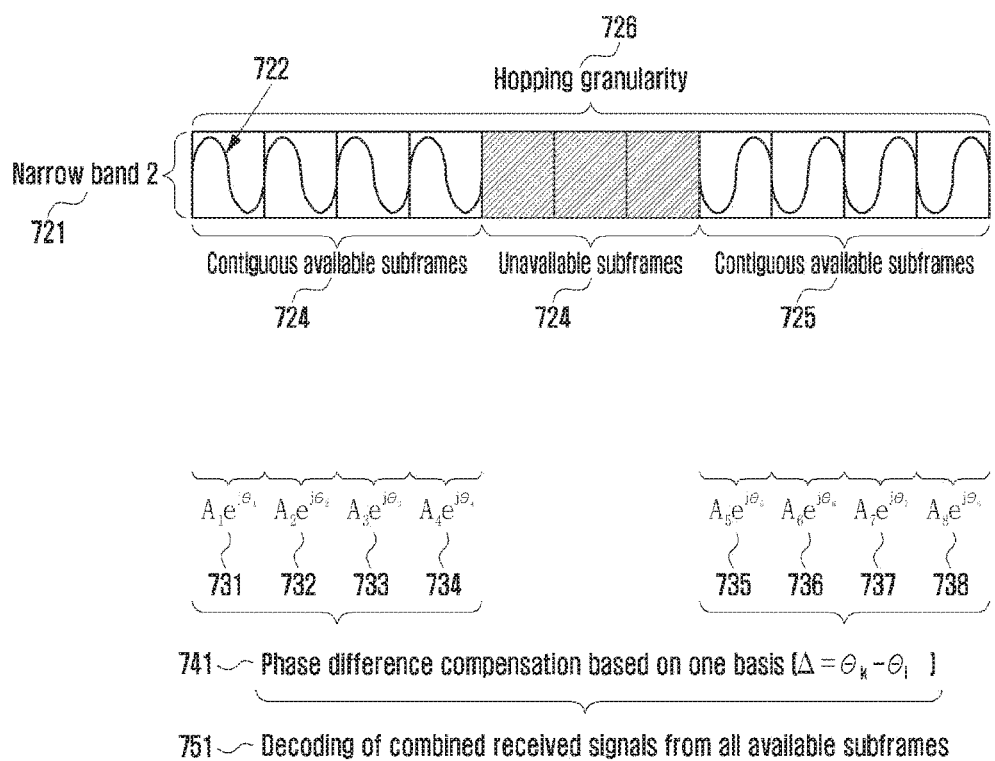
FIG. 7 is a diagram illustrating a channel estimation and downlink data decoding method according to the second embodiment of the present invention.

FIG. 7 is a diagram illustrating a channel estimation and downlink data decoding method according to the second embodiment of the present invention.

The second embodiment of the present invention proposes a first example of decoding downlink data by performing channel estimation after compensating for a phase channel difference caused by unavailable subframes.

In FIG. 7, the low-cost UE receives downlink data that are repetitively transmitted through the second narrowband 721. The repetitive transmission is a technique of transmitting the same data repetitively in a predetermined number of subframes, and the frequency hopping is a technique of switching between narrowbands in transmitting downlink data to a low-cost UE. The repetitive transmission-related information (e.g., number of subframes for repetitive transmission and available/unavailable subframes) or frequency hopping-related information (e.g., number of narrowbands for frequency hopping and hopping granularity) may be transmitted from the eNB to the UE through higher layer signaling or L1 signaling. The hopping granularity 726 means a number of subframes over which the data transmission stays at the same narrowband before hopping to another narrowband, and the repetitive transmission of the same data may be performed after hopping from one narrowband to another. The eNB schedules downlink data transmission to the UE in order for the UE to receive the downlink data during the available subframes through a certain narrowband 721. The downlink data are transmitted repetitively only at the available subframes among a plurality of consecutive subframes. The eNB may determine the available subframes and transmit the information on the available subframes to the UE through higher layer signal or L1 signaling. It may also be possible for the eNB to determine the unavailable subframes, instead of the available subframes, and transmit the information on the unavailable subframes to the UE through high layer signaling or L1 scheduling. The UE may analogize the available subframes carrying the data out of the information on the unavailable subframes. The unavailable subframes for downlink data transmission may include uplink subframes, MBSFN subframes, and subframes configured for measurement gap.

The subframes of the second narrowband 721 include available subframes 723 and 725 and unavailable subframes 724. The UE attempts to receive the repetitive transmission during the subframes corresponding to the hopping granularity 726 indicative of the number of repetitive transmissions that is set by the eNB and, although there are unavailable subframes, the number of unavailable subframes does not affect the hopping granularity 726. That is, the UE attempts to receive the repetitive transmissions at as many added available subframes as the number of unavailable subframes. In this case, when the downlink data is received, the channel has a continuous phase across the available subframes 723 and 725 as denoted by reference number 722, but the continuity is broken by the unavailable subframes 724 interposed between the available subframes 723 and 725, resulting in phase difference.

At this time, the UE may perform channel estimation on each of the consecutive available subframes 723 and 725. For example, it may be possible to estimate a channel value at every available subframe by combining demodulation RSs or CRSs carried in respective subframes as denoted by reference numbers of 731 to 738. Here, it is assumed that the large-scale fadings on the channels estimated at the individual available subframes are similar to each other. Here, on the basis of the phase of a channel value at an arbitrary subframe, the phase difference between the channels estimated at the remaining available subframes are compensated for as denoted by reference number 741. For example, in the case of compensating for the phase difference of the remaining available subframes based on the channel value 734, it may be possible to compensate the phase calculated at each subframe by subtracting the phase difference $\Delta = \theta_k - \theta_4$ from the phase $\Theta_k$ calculated at the corresponding available subframe. For example, the phase of channel value 731 may be compensated for by abstracting $\Delta = \theta_1 - \theta_4$ from $\Theta_1$. After compensating for the phase of every available subframe based on a phase of one available subframe, the UE performs cross-channel estimation for all available subframes in the hopping period using the phase compensation result. Then, the UE decodes the combined downlink signals of the available subframes in the hopping period into the downlink data using the channel estimation result as denoted by reference number 751.

Figure 8:
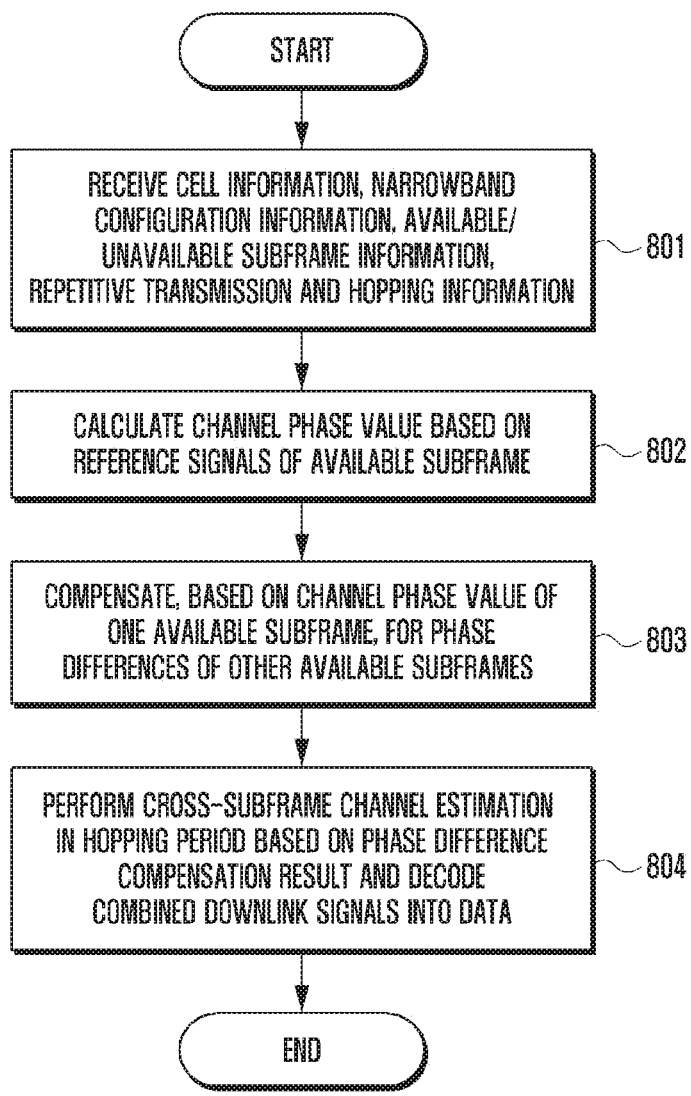
FIG. 8 is a flowchart illustrating a UE operation according to the second embodiment of the present invention.

FIG. 8 is a flowchart illustrating a UE operation according to the second embodiment of the present invention.

At step 801, the UE receives cell information, narrowband configuration information, repetitive transmission and frequency hopping information, and available/unavailable subframe information from an eNB through higher layer signaling or L1 signaling.

At step 802, the UE calculates a phase value of a channel based on a reference signal (e.g., CRS and demodulation RS) at each of the available subframes in the hopping period.

At step 803, the UE compensates for a phase difference between the available subframes based on the phase value of the channel estimated at one available subframe.

At step 804, the UE performs cross-subframe channel estimation on the combined downlink signal of the available subframes in the hopping period based on the phase difference compensation result and then decodes the combined downlink signal into the downlink data using the channel estimation result.

Figure 9:
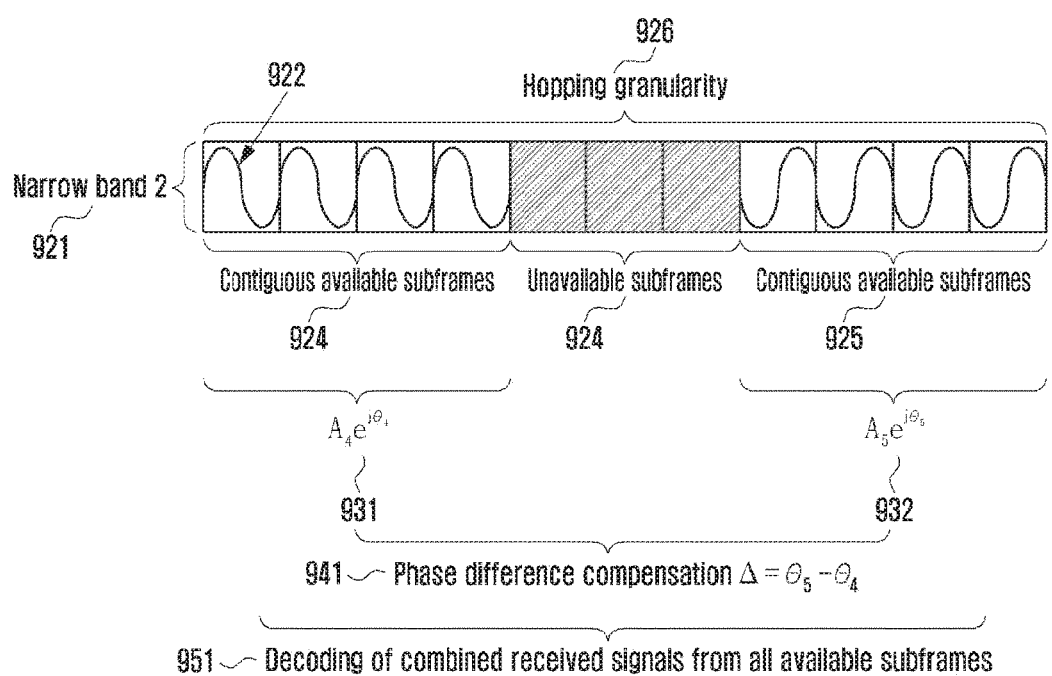
FIG. 9 is a diagram illustrating a channel estimation and downlink data decoding method according to the third embodiment of the present invention.

FIG. 9 is a diagram illustrating a channel estimation and downlink data decoding method according to the third embodiment of the present invention.

The third embodiment of the present invention proposes a second example of decoding downlink data by performing channel estimation after compensating for a phase channel difference caused by unavailable subframes.

In FIG. 9, the low-cost UE receives downlink data that are repetitively transmitted through the second narrowband 921. The repetitive transmission is a technique of transmitting the same data repetitively in a predetermined number of subframes, and the frequency hopping is a technique of switching between narrowbands in transmitting downlink data to a low-cost UE. The repetitive transmission-related information (e.g., number of subframes for repetitive transmission and available/unavailable subframes) or frequency hopping-related information (e.g., number of narrowbands for frequency hopping and hopping granularity) may be transmitted from the eNB to the UE through higher layer signaling or L1 signaling. The hopping granularity 926 means a number of subframes over which the data transmission stays at the same narrowband before hopping to another narrowband, and the repetitive transmission of the same data may be performed after hopping from one narrowband to another. The eNB schedules downlink data transmission to the UE in order for the UE to receive the downlink data during the available subframes through a certain narrowband 921. The downlink data are transmitted repetitively only at the available subframes among a plurality of consecutive subframes. The eNB may determine the available subframes and transmit the information on the available subframes to the UE through higher layer signal or L1 signaling. It may also be possible for the eNB to determine the unavailable subframes, instead of the available subframes, and transmit the information on the unavailable subframes to the UE through high layer signaling or L1 signaling. The UE may analogize the available subframes carrying the data out of the information on the unavailable subframes. The unavailable subframes for downlink data transmission may include uplink subframes, MBSFN subframes, and subframes configured for measurement gap.

The subframes of the second narrowband 921 include available subframes 923 and 925 and unavailable subframes 924. The UE attempts to receive the repetitive transmission during the subframes corresponding to the hopping granularity 926 indicative of the number of repetitive transmissions that is set by the eNB and, although there are unavailable subframes, the number of unavailable subframes does not affect the hopping granularity 926. That is, the UE attempts to receive the repetitive transmissions at as many added available subframes as the number of unavailable subframes. In this case, the waveform of the signal conveying the downlink data has a continuous phase across the available subframes 923 and 925 as denoted by reference number 922, but the continuity is broken by the unavailable subframes 924 interposed between the available subframes 923 and 925, resulting in phase difference.

At this time, the UE may perform channel estimation by set (group) of contiguous available subframes as denoted by reference numbers 923 and 925. For example, it may be possible to estimate a channel value of the contiguous available subframes based on the sum of the demodulation RSs or CRSs carried in the contiguous available subframes as denoted by reference numbers of 931 and 932. Here, it is assumed that the large-scale fadings on the channels estimated at the individual available subframes are similar to each other. Here, on the basis of the phase of a channel value at an arbitrary subframe, the phase difference between the channels estimated at the remaining available subframes are compensated for as denoted by reference number 941. For example, in the case of compensating for the phase difference at the remaining available subframes based on the channel value 931, it may be possible to compensate for the phase calculated at each subframe by subtracting the phase difference $\Delta = \theta_k - \theta_4$ from the phase $\Theta_k$ calculated at the corresponding available subframe. For example, the phase of channel value 932 may be compensated for by subtracting $\Delta = \theta_5 - \theta_4$ from $\Theta_5$. After compensating for the phase of each of the available subframe sets, the UE performs cross-channel estimation for all available subframes in the hopping period using the phase compensation result. Then, the UE decodes the combined downlink signals of the available subframes in the hopping period into the downlink data using the channel estimation result as denoted by reference number 951.

Figure 10:
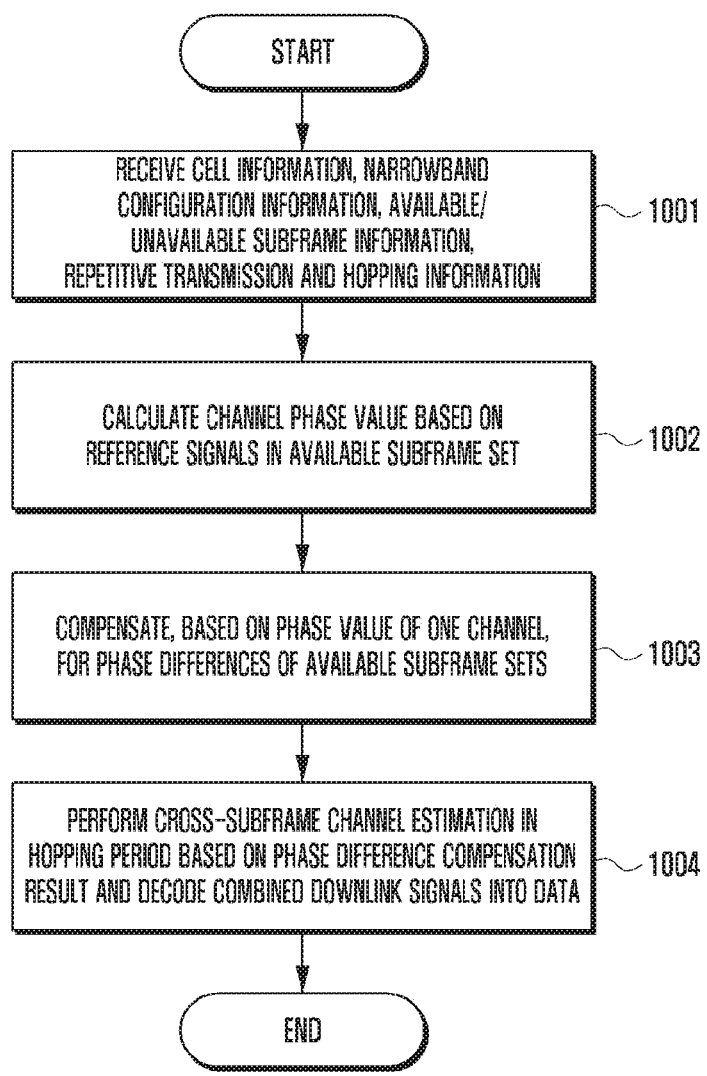
FIG. 10 is a flowchart illustrating a UE operation according to the third embodiment of the present invention.

FIG. 10 is a flowchart illustrating a UE operation according to the third embodiment of the present invention.

At step 1001, the UE receives cell information, narrowband configuration information, repetitive transmission and frequency hopping information, and available/unavailable subframe information from an eNB through higher layer signaling or L1 signaling.

At step 1002, the UE calculates a phase value of a channel per set of contiguous available subframes in a hopping period.

At step 1003, the UE compensates for a phase difference between the available subframe sets based on the phase value of one available subframe set.

At step 1004, the UE performs cross subframe channel estimation on the combined downlink signals of the available subframes in the hopping period based on the phase difference compensation result and then decodes the combined downlink signal into the downlink data based on the channel estimation result.

Figure 11:
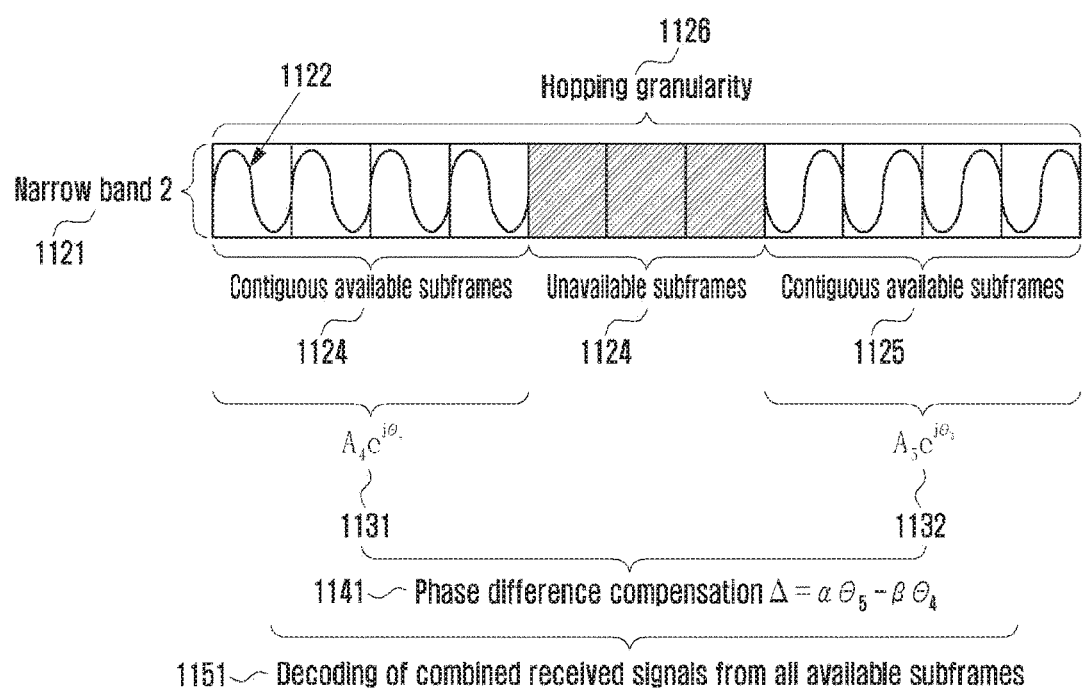
FIG. 11 is a diagram illustrating a channel estimation and downlink data decoding method according to the fourth embodiment of the present invention.

FIG. 11 is a diagram illustrating a channel estimation and downlink data decoding method according to the fourth embodiment of the present invention.

The fourth embodiment of the present invention proposes a third example of decoding downlink data by performing channel estimation after compensating for a phase channel difference caused by unavailable subframes.

In FIG. 11, the low-cost UE receives downlink data that are repetitively transmitted through the second narrowband 1121. The repetitive transmission is a technique of transmitting the same data repetitively in a predetermined number of subframes, and the frequency hopping is a technique of switching between narrowbands in transmitting downlink data to a low-cost UE. The repetitive transmission-related information (e.g., number of subframes for repetitive transmission and available/unavailable subframes) or frequency hopping-related information (e.g., number of narrowbands for frequency hopping and hopping granularity) may be transmitted from the eNB to the UE through higher layer signaling or L1 signaling. The hopping granularity 1126 means a number of subframes over which the data transmission stays at the same narrowband before hopping to another narrowband, and the repetitive transmission of the same data may be performed after hopping from one narrowband to another. The eNB schedules downlink data transmission to the UE in order for the UE to receive the downlink data during the available subframes through a certain narrowband 1121. The downlink data are transmitted repetitively only at the available subframes among a plurality of consecutive subframes. The eNB may determine the available subframes and transmit the information on the available subframes to the UE through higher layer signal or L1 signaling. It may also be possible for the eNB to determine the unavailable subframes, instead of the available subframes, and transmit the information on the unavailable subframes to the UE through high layer signaling or L1 scheduling. The UE may analogize the available subframes carrying the data out of the information on the unavailable subframes. The unavailable subframes for downlink data transmission may include uplink subframes, MBSFN subframes, and subframes configured for measurement gap.

The subframes of the second narrowband 1121 include available subframes 1123 and 1125 and unavailable subframes 1124. The UE attempts to receive the repetitive transmission during the subframes corresponding to the hopping granularity 1126 indicative of the number of repetitive transmissions that is set by the eNB and, although there are unavailable subframes, the number of unavailable subframes does not affect the hopping granularity 1126. That is, the UE attempts to receive the repetitive transmissions at as many added available subframes as the number of unavailable subframes. In this case, when the downlink data is received, the channel has a continuous phase across the available subframes 1123 and 1125 as denoted by reference number 1122, but the continuity is broken by the unavailable subframes 1124 interposed between the available subframes 1123 and 1125, resulting in phase difference.

At this time, the UE may perform channel estimation by set (group) of contiguous available subframes as denoted by reference numbers 1123 and 1125. For example, it may be possible to estimate a channel value of the contiguous available subframes based on the sum of the demodulation RSs or CRSs carried in the contiguous available subframes as denoted by reference numbers of 1131 and 1132. Unlike the third embodiment, this embodiment is characterized in that a weight factor is applied based on the number of available subframes of the available subframe set. That is, weight values $\alpha$ and $\beta$, respectively, are multiplied to the phase values as denoted by reference numbers 1131 and 1132. The subsequent steps are identical with those of the third embodiments of the present invention. That is, on the basis of the phase of a channel value at an arbitrary subframe, the phase difference between the channels estimated at the remaining available subframes are compensated for as denoted by reference number 1141. For example, in the case of compensating for the phase difference at the remaining available subframes based on the channel value 1131, it may be possible to compensate for the phase calculated at each subframe by subtracting the phase difference $\Delta=\alpha\theta_k-\beta\theta_4$ from the phase $\Theta_k$ calculated at the corresponding available subframe. For example, the phase of channel value 1132 may be compensated for by subtracting $\Delta=\alpha\theta_5-\beta\theta_4$ from $\Theta_5$. After compensating for the phase of each of the available subframe sets, the UE performs cross-channel estimation for all available subframes in the hopping period using the phase compensation result. Then, the UE decodes the combined downlink signals of the available subframes in the hopping period into the downlink data using the channel estimation result as denoted by reference number 1151.

Figure 12:
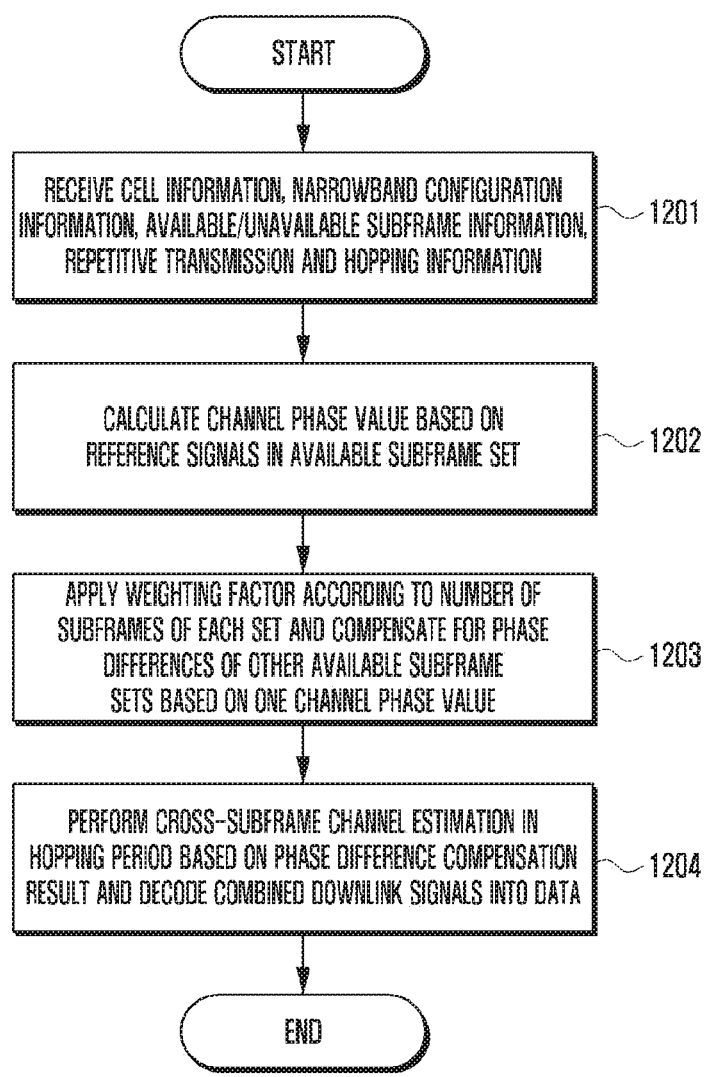
FIG. 12 is a flowchart illustrating a UE operation according to the fourth embodiment of the present invention.

FIG. 12 is a flowchart illustrating a UE operation according to the fourth embodiment of the present invention.

At step 1201, the UE receives cell information, narrowband configuration information, repetitive transmission and frequency hopping information, and available/unavailable subframe information from an eNB through higher layer signaling or L1 signaling.

At step 1202, the UE calculates a phase value of a channel per set of contiguous available subframes in a hopping period.

At step 1203, the UE applies a weight according to a number of subframes belonging to an available subframe set and compensates for phase difference between available subframe sets based on the channel phase value of one available subframe set.

At step 1204, the UE performs cross subframe channel estimation on the combined downlink signals of the available subframes in the hopping period based on the phase difference compensation result and then decodes the combined downlink signal into the downlink data based on the channel estimation result.

Figure 13:
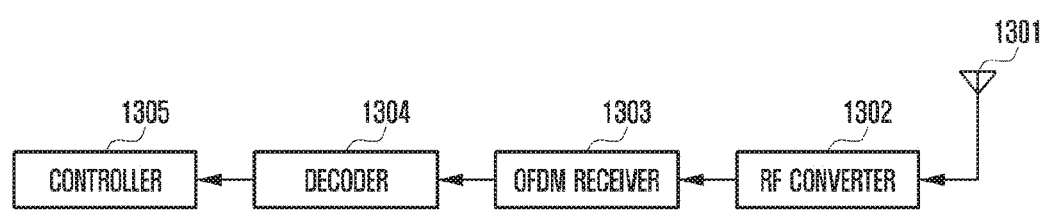
FIG. 13 is a block diagram illustrating a low-cost UE according to an embodiment of the present invention.

FIG. 13 is a block diagram illustrating a low-cost UE according to an embodiment of the present invention.

In reference to FIG. 13, the low-cost UE may include an antenna 1301 capable of receiving narrowband signals, an RF converter 1302, an OFDM receiver 1303, a decoder 1304, and a controller 1305.

The antenna 1301 of the low-cost UE converts a downlink passband signal transmitted by an eNB to an electric signal and sends the electric signal to the RF converter 1302. The RF converter 1302 performs down-conversion to convert the electric signal from the antenna 1301 to a baseband and filtering to pass narrowband signals. The RF converter 1302 converts the downlink passband signal to a baseband signal.

The baseband downlink signal from the RF converter 1302 is sent to the OFDM receiver 1303, which performs OFDM demodulation on the baseband downlink signal. The OFDM receiver 1303 includes a cyclic prefix remover, a Fast Fourier Transform (FFT) processor, and a re-mapper; and it converts the OFDM signal to a QPSK/QAM signal. The QPSK/QAM symbol generated by the OFDM receiver 1303 is used for channel estimation according to one of the first to fourth embodiments of the present invention. The decoder 1304 extracts bit-level signals transmitted by the eNB from the QPSK/QAM symbol based on the estimated channel, corrects errors that are likely to occur between the eNB transmitter and the UE receiver on the received bits using an error correction code, and sends the error-corrected signal to the controller 1305. The controller 1305 controls the operation of the UE or delivers the received information to higher layers according to the kind of the information received from the eNB.

The present invention is not limited to the above-described configuration of the UE but may include various embodiments. For example, the UE may include a transceiver (not shown) for transmitting and receiving signals and a controller (not shown) for controlling overall operations of the UE.

The transceiver may communicate signals with an eNB under the control of the controller.

The controller may control the operations of the first, second, third, and/or fourth embodiment of the present invention.

According to an embodiment of the present invention, the controller may control to receive available subframes configured to convey the same downlink data, perform channel estimation by available subframe group composed of at least one contiguous available subframe, and decode downlink data based on the channel estimation result.

The controller may generate a log likelihood ratio (LLR) value per subframe group based on the channel estimation result and decode the downlink data based on the per-LLR values.

The controller may control to receive at least one unavailable subframe configured not to convey the same downlink data. The subframe group is identified by at least one unavailable subframe.

The controller may control to receive at least one of data-receivable narrowband information, available or unavailable subframe information, and information on the number of subframes configured to carry the same downlink data repetitively.

According to an alternative embodiment, the controller may control to receive downlink subframes based on a configuration; acquire at least one channel phase value based on the available subframes configured to carry the same downlink data among the received subframes; compensate for, based on one reference channel phase value selected from the at least one channel phase value, the remaining channel phase values; and decode downlink data using the reference and compensated channel phase values.

The controller may compensate for the phase difference between the reference channel phase value and the remaining channel phase values to compensate for the remaining channel phase values.

The controller may control to receive for the above configuration before receiving the subframes at least one of data-receivable narrowband information, available or unavailable subframe information, and information on the number of subframes configured to carry the same downlink data repetitively.

For example, the controller may acquire a channel phase value per available subframe. The controller may also acquire a channel phase value per subframe group, the subframe group being composed of at least one contiguous available subframe among available subframes. Here, the received subframes may include at least one unavailable subframe that is not configured to carry the same downlink data, and the subframe group is identified by at least one unavailable subframe. In this case, the controller may compensate for the phase difference between the reference channel phase value and the remaining channel phase values or between the reference channel phase value and the remaining channel phase values that have been weighted according to the number of subframes per subframe group to compensate for the remaining channel phase values.

The embodiments disclosed in the specification and drawings are proposed to help explain and understand the present invention rather than limit the scope of the present invention. It is obvious to those skilled in the art that changes and modifications can be made thereto without departing from the spirit and scope of the present invention. If necessary, the embodiments may be combined in whole or in part.

What is claimed is:

1. A method of a terminal in a wireless communication system, the method comprising:
   receiving a configuration message including first information on available subframes for a downlink data transmission and second information on a number of subframes configured to carry a same downlink data repetitively;
   identifying the available subframes configured to carry the same downlink data among a plurality of subframes based on the first information and the second information;
   acquiring channel phase values for the available subframes;
   compensating for, using one of the channel phase values as a reference value, a remaining channel phase value; and
   decoding the same downlink data using the reference value and the compensated remaining channel phase value.

2. The method of claim 1, wherein the compensating for the remaining channel phase value comprises compensating for a phase difference between the reference value and the remaining channel phase value.

3. The method of claim 1, wherein the configuration message further comprises third information on a narrowband configuration.

4. The method of claim 1, wherein the channel phase values are acquired for the available subframes per an available subframe.

5. The method of claim 1, wherein the channel phase values are acquired for the available subframes per a subframe group, the subframe group comprising at least two contiguous available subframes among the available subframes.

6. The method of claim 5, wherein the plurality of subframes comprise at least one unavailable subframe that is not configured to carry the same downlink data, and the subframe group is identified by the at least one unavailable subframe.

7. The method of claim 5, wherein compensating for the remaining channel phase value comprises:
compensating for a phase difference between the reference value and the remaining channel phase value weighted according to a number of subframes per the subframe group.

8. A terminal comprising:
a transceiver configured to transmit and receive a signal; and
a controller configured to:
receive a configuration message including first information on available subframes for a downlink data transmission and second information on a number of subframes configured to carry a same downlink data repetitively,
identify the available subframes configured to carry the same downlink data among a plurality of subframes based on the first information and the second information,
acquire channel phase values for the available subframes,
compensate for, using one of the channel phase values as a reference value, a remaining channel phase value, and
decode the same downlink data using the reference value and the compensated remaining channel phase value.

9. The terminal of claim 8, wherein the controller is configured to compensate for a phase difference between the reference value and the remaining channel phase value.

10. The terminal of claim 8, wherein the configuration message further comprises third information on a narrowband configuration.

11. The terminal of claim 8, wherein the channel phase values are acquired for the available subframes per an available subframe.

12. The terminal of claim 8, wherein the channel phase values are acquired for the available subframes per a subframe group, the subframe group comprising at least two contiguous available subframes among the available subframes.

13. The terminal of claim 12, wherein the plurality of subframes comprise at least one unavailable subframe that is not configured to carry the same downlink data, and the subframe group is identified by the at least one unavailable subframe.

14. The terminal of claim 12, wherein the controller is configured to compensate for a phase difference between the reference value and the remaining channel phase value weighted according to a number of subframes per the subframe group.

* * * * *